United States Patent [19]
Cech et al.

[11] Patent Number: 6,039,345
[45] Date of Patent: Mar. 21, 2000

[54] SYSTEM AND METHOD FOR SENSING VEHICLE DOOR EDGE MOVEMENT

[75] Inventors: Leonard S. Cech, Strongville, Ohio; Michael R. Sewell, Chatham, Canada; Edward J. Gillis, South Lyon, Mich.; David B. Talley, Olney, Md.

[73] Assignee: Automotive Systems Laboratory, Inc., Farmington Hills, Mich.

[21] Appl. No.: 09/007,990

[22] Filed: Jan. 16, 1998

Related U.S. Application Data

[60] Provisional application No. 60/035,454, Jan. 17, 1997.

[51] Int. Cl.[7] .................................................. B60R 21/32
[52] U.S. Cl. ......................... 280/735; 180/274; 180/282; 701/45; 307/10.1
[58] Field of Search .................................. 180/274, 282; 280/735; 307/10.1; 340/436, 668, 669; 701/45; 73/514.31

[56] References Cited

U.S. PATENT DOCUMENTS

| | | |
|---|---|---|
| 2,552,722 | 5/1951 | King . |
| 3,945,459 | 3/1976 | Oishi et al. ............................. 180/274 |
| 4,087,782 | 5/1978 | Oishi et al. .............................. 280/735 |
| 4,446,741 | 5/1984 | Sirokorad et al. ......................... 73/654 |
| 4,754,644 | 7/1988 | Valentini ................................ 73/517 R |
| 4,866,418 | 9/1989 | Dobler et al. ............................ 340/429 |
| 4,991,301 | 2/1991 | Hore ......................................... 33/366 |
| 5,177,370 | 1/1993 | Meister .................................. 307/10.1 |
| 5,281,780 | 1/1994 | Cech et al. ............................ 200/52 R |
| 5,430,334 | 7/1995 | Meister .................................. 307/10.1 |
| 5,435,409 | 7/1995 | Meyer et al. ............................ 180/274 |
| 5,566,974 | 10/1996 | Mazur et al. ............................ 280/735 |
| 5,580,804 | 12/1996 | Gioutsos ................................. 280/735 |
| 5,723,789 | 3/1998 | Shannon ................................. 280/735 |

*Primary Examiner*—Paul N. Dickson
*Attorney, Agent, or Firm*—Lyon P.C.

[57] ABSTRACT

In accordance with a preferred embodiment, a vehicle crash discrimination system (10) comprises a plurality of coil sensors (18) permanently mounted to a vehicle pillar, and a magnet 20 either mounted to a door (14) edge surface juxtaposed to the coils, or to the pillar if a suitable ferromagnetic flux collector is mounted on the door edge. The shape, size and spacing of the coils is predetermined to provide output signals in the coils responsive to the change in the magnetic field caused by movement of the door surface. The change in magnetic field is analyzed to indicate a vehicle crash.

34 Claims, 5 Drawing Sheets

SYSTEM AND METHOD FOR SENSING VEHICLE DOOR EDGE MOVEMENT

CROSS-REFERENCE TO RELATED APPLICATIONS

The instant application claims the benefit of prior U.S. Provisional Application Ser. No. 60/035,454 filed Jan. 17, 1997.

TECHNICAL ART

The instant invention generally relates to vehicle crash discrimination systems, and more particularly to a system suitable for reliably detecting impacts to the side of a vehicle.

BACKGROUND OF THE INVENTION

Generally speaking, there are known vehicle crash detection systems which attempt to detect side impacts using accelerometers mounted on the B-pillar, the rocker panel, the reinforcing beam, or some other location on or near the door of the vehicle. Other known systems use contact switches, or sense pressure changes within the door. Some distributed sensing systems have also been proposed.

These systems have not proven entirely satisfactory. More specifically, signals received by accelerometers and contact switches vary greatly depending on the location, magnitude and direction of impact. These arrangements only provide localized acceleration and velocity information, which does not necessarily reflect what is happening away from their mounting point. For example, a 15 mph pole impact (a typical airbag deployment scenario) which occurs at the sensor mounting location can induce a relatively large amplitude signal which initiates a proper air bag deployment, while one that occurs a foot or two away may give sensor signals having significantly lower amplitude thereby resulting in non-deployment of the air bag. This makes it very difficult to discriminate "fire" conditions from "no fire" situations in many cases.

Distributed sensor arrangements are difficult to install and maintain. Their cost may also be excessive due to the need for increased wiring and mounting requirements.

Furthermore, most accelerometers require a power source and thus present another potential point of system failure. Yet further, post-installation calibration of such sensors must generally be done electronically. While this may insure accurate sensing of acceleration relative to the module, it can not account for changes in the module mounting support or orientation which could result from damage caused by prior "no fire" collisions.

U.S. Pat. No. 5,580,084 discloses and claims a system and method for controlling actuation of a vehicle safety device by detecting variations in the magnetic field that is influenced by a ferromagnetic element mechanically coupled to a portion of the vehicle subject to plastic strain, whereby the plastic strain creates elastic strain waves in the ferromagnetic element which causes the ferromagnetic properties thereof to be altered by the strain waves though the process of magnetostriction. U.S. Pat. No. 5,580,084 does not teach the generation of a signal from the change in reluctance of a magnetic circuit caused by the rigid body motion of the elements therein. Furthermore, the variations in the magnetic field caused by elastic strain waves in the ferromagnetic element resulting from magnetostriction provides in itself a very low amplitude signal which is relatively insignificant with respect to variations in magnetic field caused by relative motion of rigid body elements in an associated magnetic circuit resulting from macroscopic magnetic inductive effects.

SUMMARY OF THE INVENTION

The instant invention solves the above-noted problems by providing a magnetic induction sensing system which creates a magnetic path which spans across proximal portions of two proximal elements of a motor vehicle which undergo relative motion responsive to a crash, for example proximal portions of the vehicle B-pillar and the edge surface of the associated vehicle door. As a side impact crash sensor, the instant invention detects automotive collisions that occur on or near a driver side or passenger side door, and is capable of sensing crashes whether they are localized (such as pole crashes) or broad-area hits (like bumper hits) from its mounting location on the B-pillar.

When subjected to a side impact collision, the relatively rigid vehicle door beam transfers the crash signal to the edge wall of the door. The door beam acts in rotation to magnify the motion of the crash. Therefore, a measurement of acceleration at the door edge wall captures the effects of impacts to the door and is effective for controlling the actuation of an associated side impact air bag which is useful for mitigating injury to an associated occupant subjected to a side-impact crash. Magnetic induction sensors mounted on the relatively fixed structure of the car, such as the A and B-pillars, register substantial signals that correlate well with the motion of the associated proximal edge wall of the door. These signals are caused by macroscopic motions and not magnetostrictive effects.

The instant invention incorporates a plurality of coils mounted on a pillar of the car adjacent the door edge. With a single sensing coil it is extremely difficult to resolve the exact nature and amplitude of relative motion between the edge wall and pillar during impact, in part because of variations in the edgewall/pillar spacing that can occur amongst vehicles, or within the same vehicle over time. This problem is exacerbated because of the different types of relative motions that occur during a side impact motion in the crash direction, movement of the edge wall toward or away from the A/B pillar, and twisting and rotation of the edge wall. These multiple motions and variations in distance can be resolved with multiple coils on the pillar, and by control of the variations in the magnetic field along the edge wall.

In accordance with a first aspect of the instant invention, a system for discrimination vehicle crash situations comprises at least one coil mounted to a flame member of the vehicle, a magnet mounted to a vehicle member so as to create a magnetic field detectable by the at least one coil, and a processor connected to the at least one coil, wherein the at least one coil is induced into producing an output signal in response to change in the magnetic field caused by movement of the vehicle member in relation to the frame member. The processor analyzes the at least one coil output to determine if the change in magnetic field is indicative of a vehicle crash.

In accordance with a second aspect of the instant invention, a method of discriminating a vehicle crash comprises the steps of creating a magnetic field between an exterior structural member of the vehicle and a juxtaposed vehicle frame member, and detecting changes in the magnetic field, wherein movement of the exterior structural member relative to the frame member causes corresponding changes in the magnetic field. A vehicle collision is determined based on the detected change in the magnetic field.

Accordingly, one object of the instant invention is to provide an improved vehicle crash discrimination system and method that can be mounted to a vehicle pillar and still reliably detect side impacts occurring anywhere along the outer surface of the vehicle side, such as at a door or quarter panel location.

A further object of the instant invention is to provide an improved vehicle crash discrimination system and method that discriminates vehicle crashes by sensing motion of a vehicle door edge.

A yet further object of the instant invention is to provide an improved vehicle crash discrimination system and method that detects motion of a vehicle door edge without extending any electrical wiring to the door.

A yet further object of the instant invention is to provide an improved vehicle crash discrimination system and method that detects motion of a vehicle door edge via magnetic induction.

A yet further object of the instant invention is to provide an improved vehicle crash discrimination system and method that detects motion of a vehicle door edge via magnetic induction utilizing a coil arrangement which can detect three-dimensional motion.

In accordance with these objectives, one feature of the instant invention is a magnetic circuit spanning across proximal portions of two proximal elements of the motor vehicle which undergo relative motion responsive to the crash, whereby the magnetic circuit comprises a magnet for creating a magnemotive force within the magnetic circuit and one or more coils for detecting a change in the magnetic field of the magnetic circuit.

Another feature of the instant invention is a magnetic circuit with the one or more coils mounted on one of the proximal portions and a magnet mounted on the other proximal portion.

Yet another feature of the instant invention is a magnetic circuit with a coil and magnet mounted on the same proximal portion and a ferromagnetic structure mounted on the other proximal portion.

Yet another feature of the instant invention is the incorporation of a vehicle door edge as one of the proximal portions and the portion of the vehicle body structure adjacent thereto as the other proximal portion.

Yet another feature of the instant invention is a signal processor for controlling the activation of a motor vehicle safety restraint system responsive to the signals from the coils.

Yet another feature of the instant invention is the control of a motor vehicle safety restraint system responsive to the magnitude of the maximum amplitude signal, from the coils.

Yet another feature of the instant invention is the control of a motor vehicle safety restraint system responsive to the width of the maximum amplitude signal, from the coils.

Yet another feature of the instant invention is the control of a motor vehicle safety restraint system responsive to the separation in time of the signals from a plurality of coils.

Yet another feature of the instant invention is detection of side impact crashes by sensing the acceleration of a vehicle door edge.

The specific features of the instant invention provide a number of associated advantages. One advantage of the instant invention with respect to the prior art is that by sensing the motion of a vehicle door edge, impacts to any significant part of the vehicle door can be detected.

The instant invention will be more fully understood after reading the following detailed description of the preferred embodiment with reference to the accompanying drawings. While this description will illustrate the application of the instant invention for controlling the activation of a side impact safety restraint system, it will be understood by one with ordinary skill in the art that the instant invention can also be applied to crash sensing systems by sensing the relative motion of other proximal elements of the vehicle, such as for sensing frontal impacts by sensing the relative motion of the hood and fender.

DETAILED DESCRIPTION OF THE PREFERRED EMBODIMENT(S)

Figure 1:
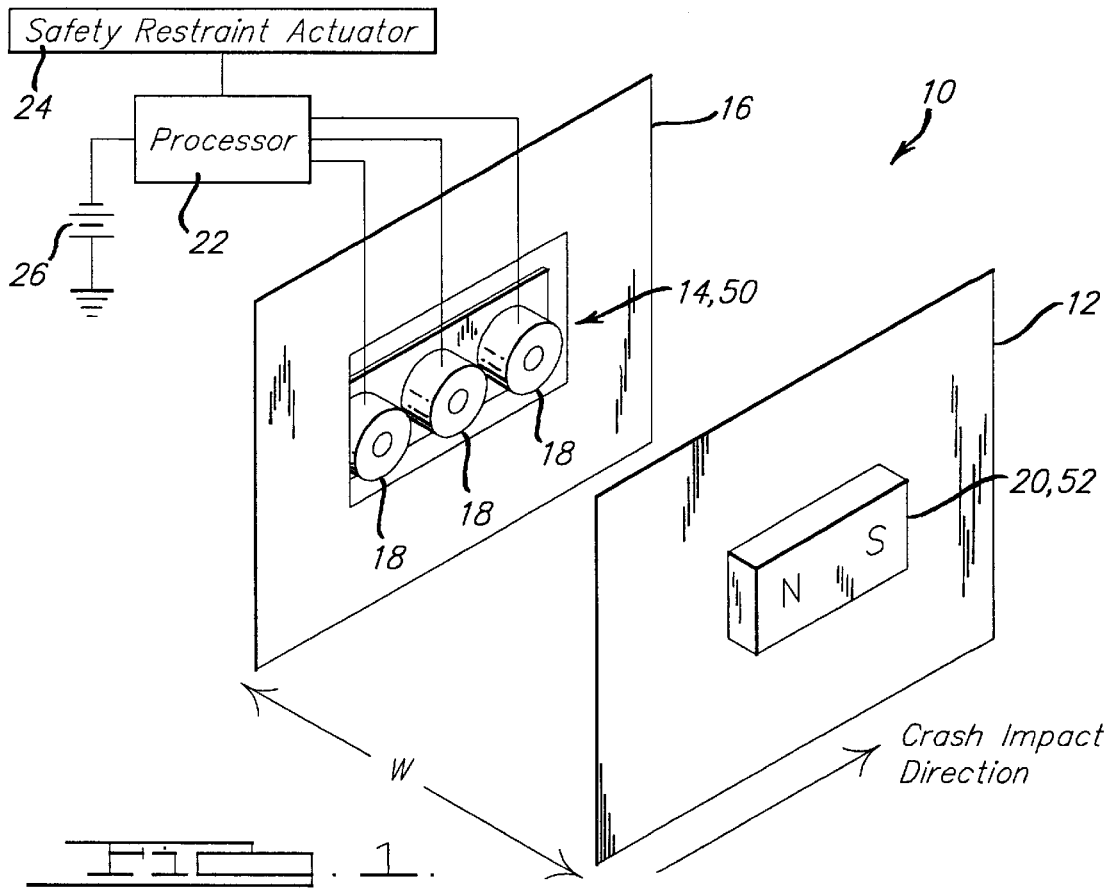
FIG. 1 illustrates a vehicle crash discrimination system incorporating a magnetic induction sensor in accordance with a first embodiment of the instant invention.
Figure 4:
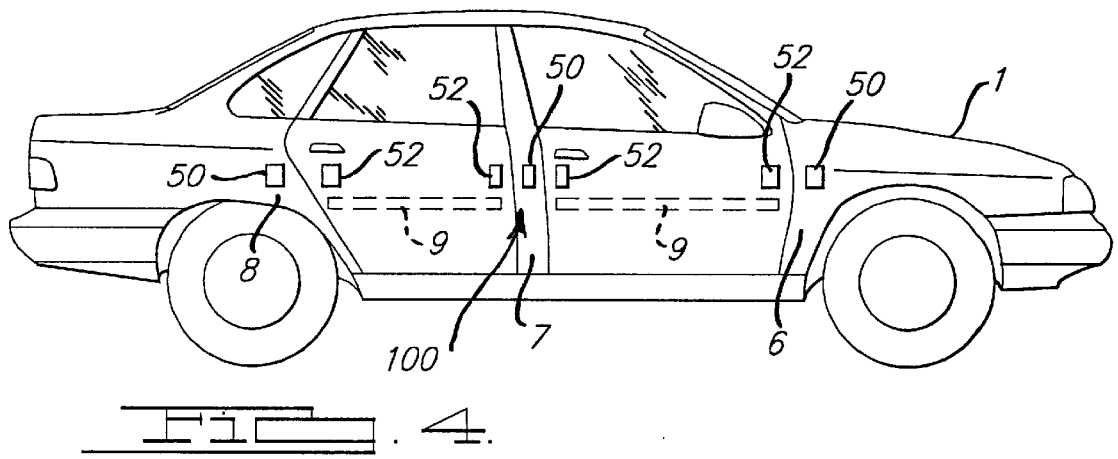
FIG. 4 illustrates various mounting arrangements of the instant invention for a side impact crash sensing system.

Referring to FIGS. 1 and 4, because of problems in installing and servicing sensors on or inside a vehicle door, and more importantly, in guaranteeing the integrity of the signal path during a serious crash, a crash discrimination system 10 in accordance with the instant invention is arranged to sense the motion of the door's edge wall from a mounting location on the frame of the car, such as the vehicle B-pillar 16. A lateral reinforcing beam 9 conventionally located inside the door guarantees that a serious impact anywhere on the door will be transmitted almost immediately to the edge wall 12 of the door.

Figure 2:
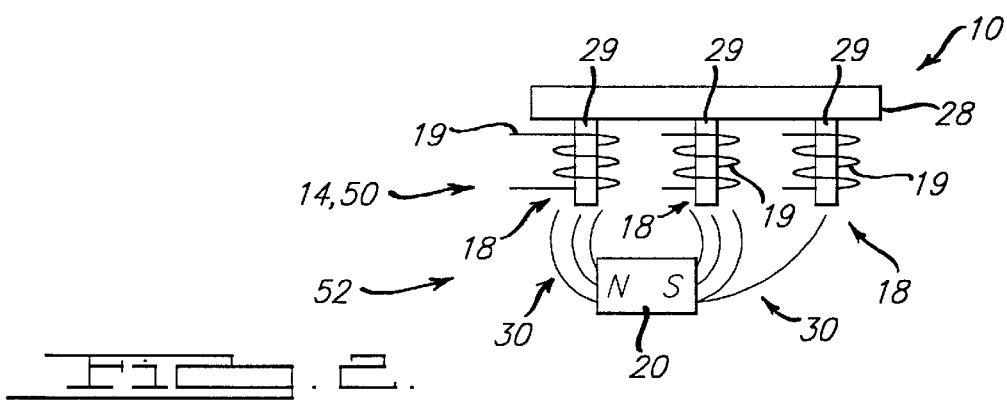
FIG. 2 illustrates the magnetic circuit of the magnetic induction sensor illustrated in FIG. 1.

Referring to FIGS. 1 and 2, in accordance with one embodiment of the instant invention, a magnetic induction sensor 14, comprising a plurality of coils 18 mounted to a flux collector 28, is mounted proximal, for example in the A and/or B-pillar 16, to a magnet 20 attached to the edge wall 12 of the door. The magnetic induction sensor 14 is separated from the magnet 20 by an air gap. Each of the plurality of coils 18 comprises a winding 19 over a ferromagnetic pole piece 29, whereby the combination of the coils 18, pole pieces 29, flux collector 28, magnet 20 and air gap comprise a magnetic circuit, for which the magnet provides a magnemotive force which creates flux linkages 30 within the magnetic circuit.

In operation, an impact to the door sufficient to engage the lateral reinforcing beam 9 thereof moves the edge wall 12 of the door causing the magnet 20 to move with respect to the magnetic induction sensor 14 thereby changing the flux linkages 30 to each of the coils 18 so as to generate a signal therein in accordance with Faraday's law. The output signals from each of the coils 18 is correlated with the macroscopic motion of the edge wall 12 of the door The output signals from the coils 18 are operatively coupled to a processor 22, which controls the activation of one or more safety restraint actuators 24 responsive thereto. The processor 22 can comprise a variety of means including but not limited to digital circuitry, analog circuitry, relay logic, a digital computer, a microprocessor, a digital signal processor, or a combination in whole or in part thereof, and furthermore, can be integrated into a conventional accelerometer-based sensing module.

In general, in accordance with the instant invention, a magnetic induction sensor is formed by creating a magnetic circuit spanning across proximal portions of two proximal elements of a motor vehicle, wherein one component of the magnetic circuit 50 is attached to one of the proximal elements, and a remaining component of the magnetic circuit 52 is attached to the other proximal element. The magnetic circuit comprises one or more magnets 20 for creating a magnemotive force within the magnetic circuit, and one or more coils 18 which are responsive to the magnetic field—particularly to motion induced changes thereto—within the magnetic circuit.

Figure 3:
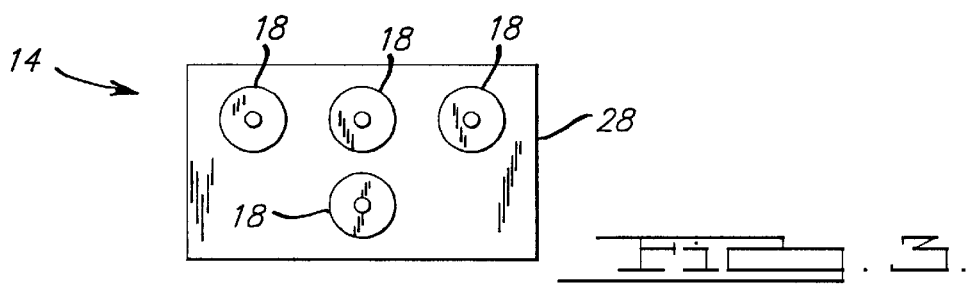
FIG. 3 is a block diagram showing a vehicle crash discrimination system in accordance with a second embodiment of the instant invention.
Figure 5:
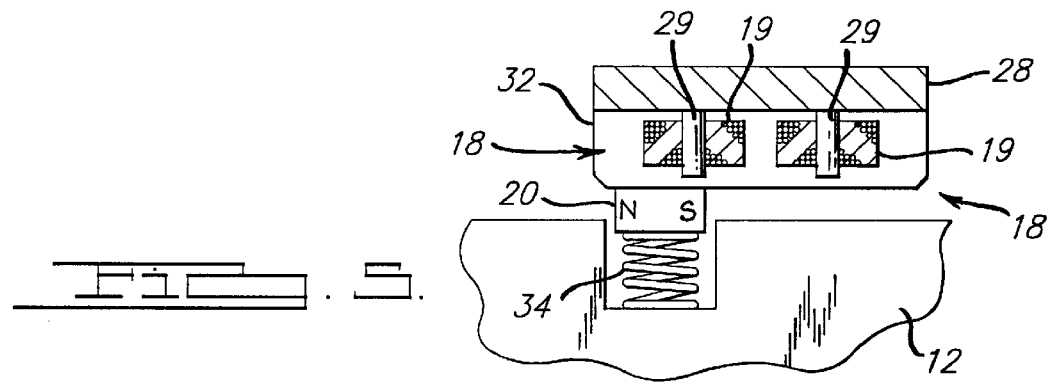
FIG. 5 illustrates an arrangement of the instant invention which is relatively immune to relatively skewed motion of the proximal elements.

The magnetic induction sensors 14 comprises plurality of coils 18 proximate one another and operatively connected to a flux collector 28. While a single sensing coil could be employed, the use of a single coil does not necessarily provide sufficient output to facilitate determination of the exact nature and amplitude of relative motion between the edge wall and pillar during an impact. This is partly due to variations in edge wall/pillar spacing that can occur between vehicles, or in the same vehicle over time. The problem is exacerbated because of the different types of relative motion that occur during a side-impact motion in the crash direction, movement of the edge wall toward or away from the A/B pillar, and twisting and rotation of the edge wall. Referring to FIG. 3, the coils 18 of the magnetic induction sensors 14 may be arranged on the flux collector 28 so as to be responsive to general transverse motions of the magnet, whereby for example three coils 18 are located along the path of the magnet 20 during normal operation of the door, and one coil is located so as to enable the determination of the direction of a vertical deflection of the edge wall 12 of the door. Furthermore, referring to FIG. 5, the magnet may be provide with a spring 34 so as to bias the magnet to slide adjacent the proximal surface of the magnetic induction sensor 14.

The crash discrimination system 10 further comprises a small magnet 20 either fixed permanently across from the coils 18 on the door's edge wall (as shown in FIG. 1), or placed on the pillar with a ferromagnetic flux collector located on the edge wall. This allows an integrated sensor comprising a fixed set of magnet(s) 20 and coil(s) 18 to detect changes in the reluctance of the system caused by door movement. The size, shape and sensing pattern of the coils 18 are designed in accordance with principles known to one or ordinary skill in the art to provide sufficient signal levels and motion detection information. These characteristics are also selected so that crash discrimination system 10 can operate over the lifetime of the vehicle and survive a potentially harsh environment, e.g., moisture, oil, grease, dirt, temperature, etc.

The crash discrimination system 10 functions by continuously sampling the voltage response from each coil 18. The use of a plurality of coils precisely located on the pillar improves detection of the change in magnetic field across the field of movement of the door surface. The size, position, and orientation of at least two of the coils 18 are arranged to be similar so that all coils experience the same pillar motion. Comparison of the signals from the coils can be used to resolve the relative motion in different dimensions, such as in the crash direction, changes in separation of the edge wall and pillar, and twisting or rotation of the edge wall. Because the size, shape, spacing and pattern of each coil 18 is known apriori, three or four coils are generally sufficient to determine the following dominant modes of relative motion: (1) translation in the crash direction; (2) change in the gap w between edge wall and pillar; (3) twisting and rotation of the edge wall; and (4) possible vertical motion, however two coils may suffice. Initial separation of pillar and edge wall can be determined based on sensor outputs occurring during opening and closing of the door in noncrash situations. More specifically, regular calibration of the system is accomplished during door openings and closings, which inherently induce extremely large deterministic magnetic field variations resulting in distinct sensor signals having a distinctive signature. The nature of these signals can be compared against baseline data to periodically determine the status of the sensor.

Figure 6:
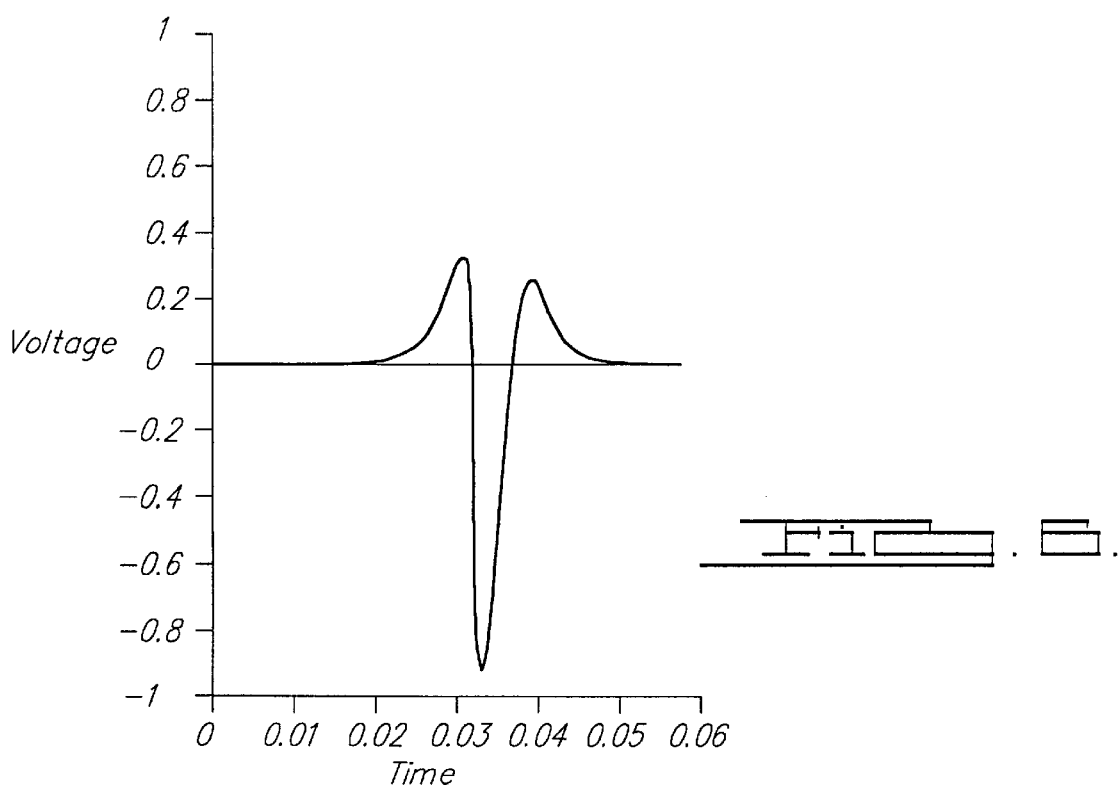
FIG. 6 illustrates the output of a single coil in accordance with the instant invention.
Figure 7:
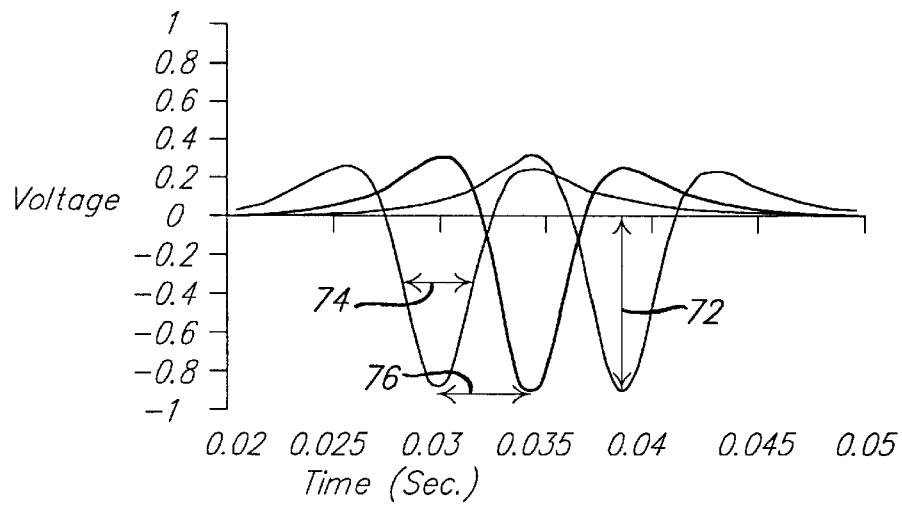
FIG. 7 illustrates the outputs from three coils in accordance with the instant invention, and further illustrates various signal processing measures.

Referring to FIG. 6, the voltage output from a single coil is generally asymmetric because of the nonuniform velocity of the magnet 20 relative to a sensing coil 18. FIG. 7 illustrates the output from three sensing coils 18 arranged in accordance with FIG. 1, whereby the signals from the separate coils 18 are shifted in phase relative to one another in accordance with the positions of the coils relative to the motion of the magnet 20. FIG. 7 also illustrates three different measures from which the peak velocity of the edge wall 12 of the door can be estimated. More particularly, the edge wall velocity is linearly related to either the peak magnitude 72 of the coil signal, or to the peak width 74 of the coil signal, where signal width is defined as the time interval at a given magnitude level, such as the 50 percent level. Furthermore, the edge wall velocity can be estimated by dividing the known distance between adjacent coils 18 by the corresponding time interval 76 between associated signal peaks.

Figure 8:
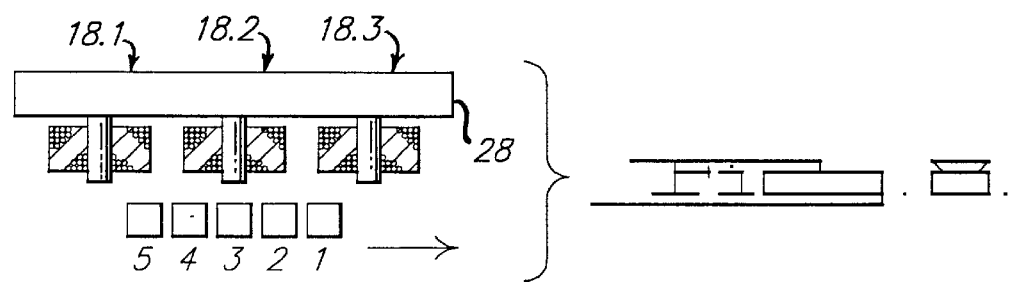
FIG. 8 illustrates various arrangements or a magnet relative to a set of three coils in accordance with the instant invention and in accordance with FIGS. 9 and 10.
Figure 9:
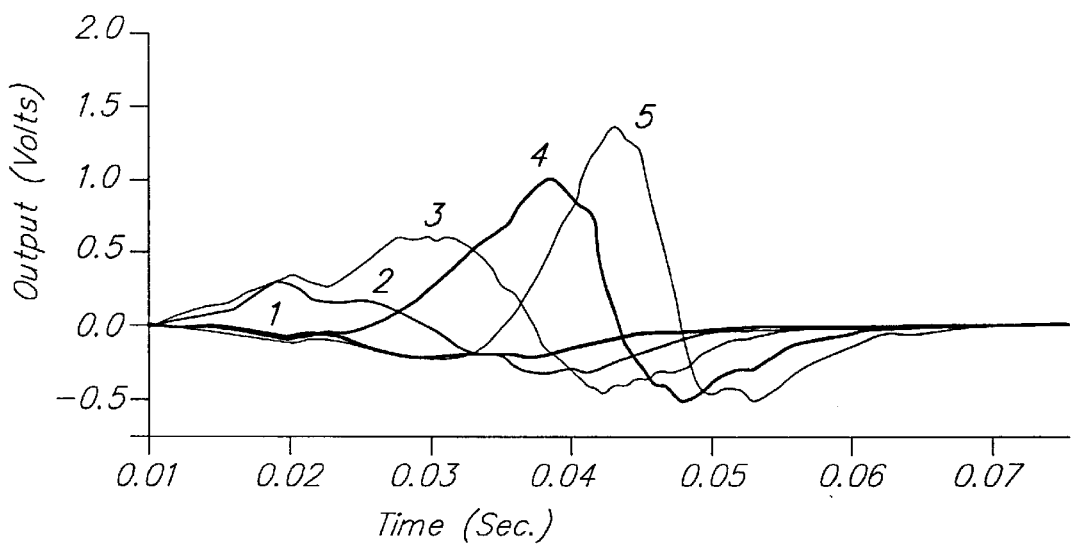
FIG. 9 illustrates the signal from the second coil in accordance with the arrangement of FIG. 8 for various initial positions of a magnet relative to the coils.
Figure 10:
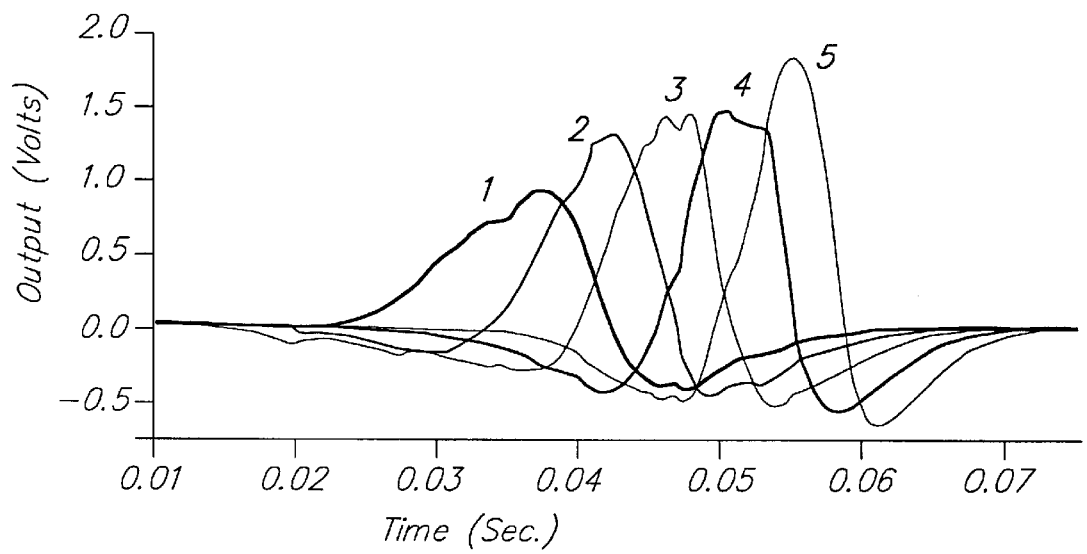
FIG. 10 illustrates the signal from the third coil in accordance with the arrangement of FIG. 8 for various initial positions of a magnet relative to the coils.

The output from the sensing coils 18 is dependent upon the initial position of the magnet 20 relative to the coil assembly. Referring to FIGS. 8, 9 and 10, a magnet 20 is located at five different positions 1,2,3,4,5 relative to a coil assembly comprising coils 18.1 (coil 1), 18.2 (coil 2), and 18.3 (coil 3). FIG. 9 illustrates the output of coil 2 while FIG. 10 illustrates the output of coil 3. The nominal location of the magnet 20 relative to the coil assembly can be calibrated by observing normal door opening an closing events.

Figure 11:
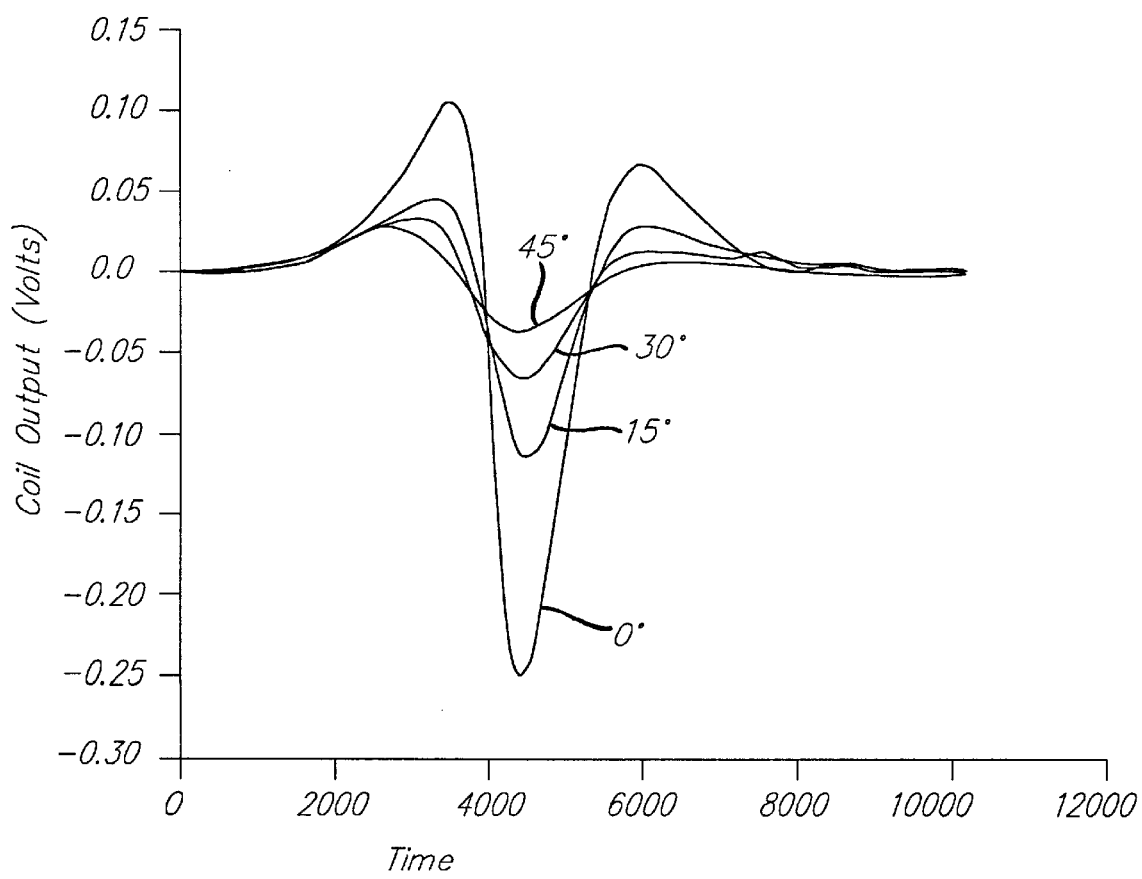
FIG. 11 illustrates the signals from one of the coils of the instant invention for relatively skewed motions of the proximal elements.

Referring to FIG. 11, the signal from the sensing coil 18 is further influenced by components of relative motion directed along the axis of the sensing coil. The angle associated with each of the curves in FIG. 11, i.e. 0, 15, 30, and 45 degrees respectively, is the angle of the magnet path relative to the plane normal to the axis of the sensing coil, where it is observed that both the magnitude and phase of the sensing coil 18 is influenced by the orientation of the magnet path relative to the sensing coil. This information can be used by the processor 22 to estimate the direction of magnet motion.

Figure 12:
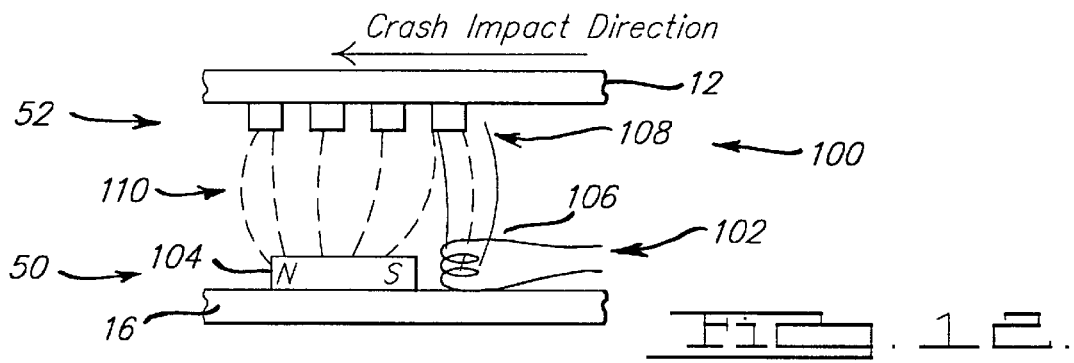
FIG. 12 illustrates a vehicle crash discrimination system incorporating a magnetic induction sensor in accordance with a second embodiment of the instant invention.

Referring to FIG. 12, in accordance with a second embodiment of the instant invention, a crash discrimination system 100 incorporates a magnet 104 and one or more sensing coils 106 to detect changes in the magnetic field 110 caused by changes to the reluctance of the associated magnetic path resulting from the motion of the edge wall 12 of the door. The edge wall 12 of the door is provided with a ferromagnetic structure 108 to enhance delectability of the edge wall motion.

Crash discrimination system 100 comprises either single magnetic induction sensor 102 for full side crash detection in two-door cars, or a single module having two magnetic induction sensors 102 where one faces a front door and the other faces the back door to provide full side crash coverage in four-door cars. The magnetic induction sensor 102 is a passive device, which is very compact, and easy to install and maintain. In addition, as with crash discrimination system 10, magnetic induction sensor 102 is easily integrated with an accelerometerbased sensing system to enhance crash discrimination performance.

Crash discrimination system 100 differs from crash discrimination system 10 by detecting movement of the door via changes in the reluctance of the magnetic flux path which arise from changes in the geometry of the frame member and edge wall that are caused by the crash acceleration. The magnet 104 effectively remains stationary with respect to the one or more coils while some part of the magnetic circuit is moved by the crash motion. This change in reluctance causes a change in the magnetic flux through the one or more coils. The change in reluctance of the magnetic path can be sensed directly, or as a voltage induced in the one or more associated coils thereby.

As with crash discrimination system 10, crash discrimination system 100 provides the ability to discriminate crash induced acceleration and/or deformation of the door along more than just the axis normal to the door surface. This additional data, which is not provided by single axis accelerometers or contact switches, may be usefull in crash algorithms. Additionally, as with crash discrimination system 10, the magnetic induction sensor 102 facilitates routine mechanical calibration based on signals generated during door openings and/or closings.

As shown in FIG. 4, crash discrimination system 10 comprises at least one magnetic induction sensor 102 mounted on a vehicle B-pillar 7, and oriented toward a magnetically susceptible region of the side door edge wall. One advantageous aspect of the instant invention derives from the ability to sense what is occurring on the edge wall without being in direct physical contact with the door. In contrast to an accelerometer that provides only "local" information of external structures such as the side door, crash discrimination system 100 operates by detecting door edge wall movement due to impact and deformation changes in the door associated with side crashes.

The magnetic induction sensor 102 comprises at least one magnet 104, at least one sensing coil 106, and associated flux collection/direction paths made of magnetically susceptible material. The magnet creates a magnetic field in adjacent or nearby materials that are magnetically susceptible. Surfaces of nonmagnetic material can be made magnetically susceptible by being sprayed over a small area with a magnetic coating like nickel paint. The nature of the susceptible area can be easily manipulated by applying an "etch" or grid pattern which can be selected to further enhance the performance of the sensor. If the surface is coated, the etch pattern can be made directly on the located surface. If the surface is not coated, a pre-fabricated magnetic pattern fixture can be fixed on the surface of the door edge wall. The flux collector/director elements in the sensor unit also act with the grid pattern to enhance operation.

When the material comprising the magnetic path is moved by sudden acceleration, the reluctance of the magnetic path is altered, thereby causing a change in magnetic flux 110 through the coil. This generates an electromotive force and a current in the coil 106, thus providing an electrical signal of the mechanical disturbance in the door edge wall. Because the effects of an impact anywhere on the door are rapidly transmitted by the door beam to the door edge wall causing a motion thereof, severe localized intrusions like pole and angular crashes can be recognized almost immediately. The information in the pattern and amplitude of the signal can be used to distinguish deployment situations from high level "off" conditions like door slams, bicycle hits, and minor crashes which do not cause significant deformation or movement of the door edge wall.

By choosing an optimal etch pattern 108, the relevant signal features can be further enhanced for crashes and minimized for "off" conditions. The characteristics of the magnetic induction sensor 102 and susceptible region characteristics can be controlled to achieve an electromechanicalband pass filter which will attenuate "off" condition signals and pass and/or amplify crash signals. This will provide quicker and more accurate crash sensing algorithms.

Further, the magnetic induction sensor 102 of the instant invention could be used in conjunction with a standard accelerometer (uni-axial or tri-axial) to further enhance the performance of a crash sensing system. By packaging an accelerometer with one or two magnetic induction sensors in a single module mounted on the B-pillar, full side collision sensor coverage can be achieved with low cost, easy installation and maintainability. The combined knowledge of B-pillar acceleration and door edge wall behavior allows discrimination of airbag "fire" and "off" conditions in virtually all situations while decreasing the "time to fire" decision period in many cases.

While crash discrimination system 100 has been described as one embodiment of the instant invention, the magnetic induction arrangement of crash discrimination system 10 is preferred. The use of a single sensing coil 106 makes it difficult to interpret signals that are dependent on motions and spatial separations that occur in three dimensions. Further, variations in the magnetic field along the edge wall of the door caused by detailed structure of the door instead of the system design, make the problem of interpreting the signals more difficult.

Figure 13:
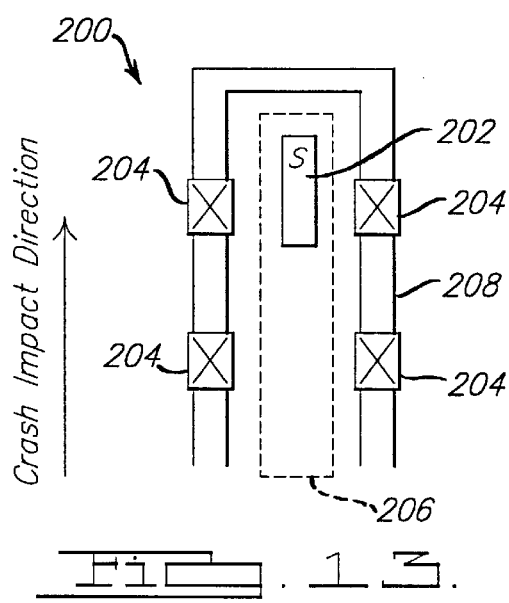
FIG. 13 illustrates a vehicle crash discrimination system incorporating a magnetic induction sensor in accordance with a third embodiment of the instant invention.
Figure 15:
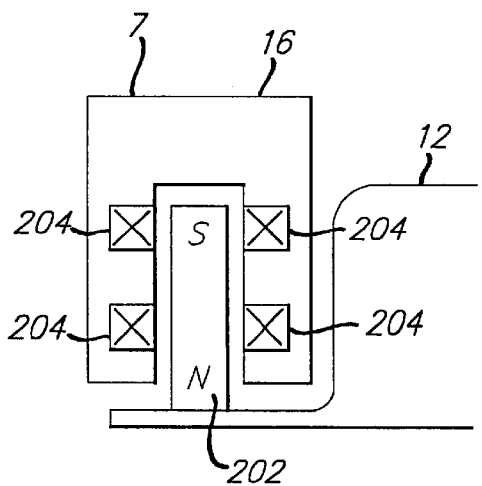
FIG. 15 illustrates an environment of the third embodiment of the instant invention illustrated in FIG. 13.

Referring to FIGS. 13 and 15, in a third embodiment of a crash discrimination system 200, a magnet 202 is secured to the edge wall 12 of the door and further engages a magnetically susceptible housing 208 within the associated B-pillar. The housing contains four coils, which provide signals that automatically compensate for the fore/aft motion of the magnet during the crash. Furthermore, in some pole crashes, the edge wall moves away from the vehicle, which causes the magnet 202 to move out of the cavity, resulting in a change in flux through the associated coils 204.

Figure 14:
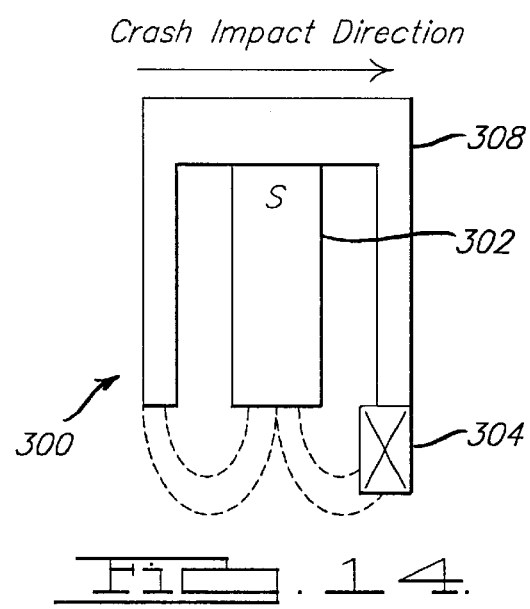
FIG. 14 illustrates a vehicle crash discrimination system incorporating a magnetic induction sensor in accordance with a fourth embodiment of the instant invention.
Figure 16:
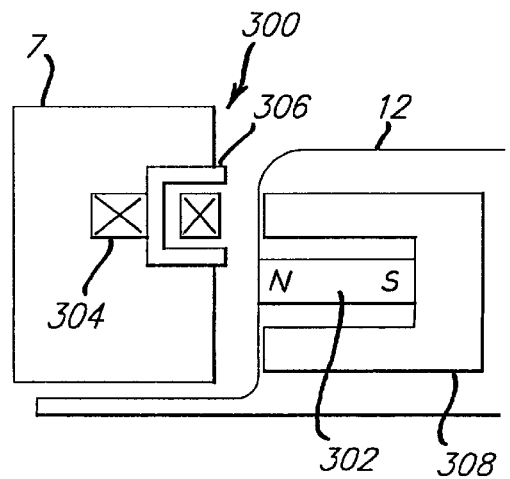
FIG. 16 illustrates an environment of the fourth embodiment of the instant invention illustrated in FIG. 14.

Referring to FIGS. 14 and 16, in a fourth embodiment of a crash discrimination system 300, a magnet 302 and flux collector 308 are secured to the edge wall 12 of the door and a coil is positioned within the associated B-pillar 7 adjacent the flux collector 308. The flux collector may be constructed from either a ferromagnetic or a paramagnetic material. The coil 304 may further incorporate a pole piece 307. The motion of the door edge 12 relative to the coil 304 changes the flux linkages in the coil, thereby inducing a voltage signal across the terminals of the coil 304.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. An apparatus for controlling the activation of a motor vehicle safety restraint system responsive to a crash, comprising:
   a. a motor vehicle comprising a first set of two proximal elements that undergo relative motion responsive to the crash;
   b. a first magnetic circuit spanning between proximal portions of said two proximal elements of said motor vehicle, wherein said first magnetic circuit has both a magnetic field and a reluctance, the magnetic field of said first magnetic circuit is responsive to the reluctance of said first magnetic circuit, the reluctance of said first magnetic circuit responsive to said relative motion, and said first magnetic circuit comprises:
      i). a first plurality of coils responsive to the magnetic field of said first magnetic circuit;
      ii). at least one first permanent magnet as the source of magnetomotive force for said first magnetic circuit; and
      iii). at least one first air gap between said two proximal elements of said motor vehicle, wherein said at least one first air gap defines a first separation zone; and
   c. a processor operatively connected to said first plurality of coils, wherein said magnetic field of said first magnetic circuit is responsive to said relative motion of said first set of two proximal elements of said motor vehicle, each of said first plurality of coils generates a signal responsive to the changes in said magnetic field of said first magnetic circuit, and said processor controls the activation of said motor vehicle safety restraint system responsive to said signal.

2. An apparatus for controlling the activation of a motor vehicle safety restraint system responsive to a crash as recited in claim 1, wherein one of said two proximal elements of said motor vehicle comprises an edge wall of a first door of said motor vehicle and the other of said two proximal elements of said motor vehicle comprises a fixed portion of said motor vehicle proximate thereto.

3. An apparatus for controlling the activation of a motor vehicle safety restraint system responsive to a crash as recited in claim 2, wherein an axis of each of said first plurality of coils is substantially normal to said first separation zone.

4. An apparatus for controlling the activation of a motor vehicle safety restraint system responsive to a crash as recited in claim 3, wherein said first plurality of coils are attached to said fixed portion of the vehicle and said at least one first permanent magnet is attached to said fixed portion of the vehicle.

5. An apparatus for controlling the activation of a motor vehicle safety restraint system responsive to a crash as recited in claim 4, wherein said first magnetic circuit further comprises a ferromagnetic structure attached to said edge wall of said first door of the vehicle.

6. An apparatus for controlling the activation of a motor vehicle safety restraint system responsive to a crash as recited in claim 1, wherein an axis of each of said at least one first permanent magnet is substantially parallel to the direction of said relative motion.

7. An apparatus for controlling the activation of a motor vehicle safety restraint system responsive to a crash as recited in claim 1, wherein an axis of each of said at least one first permanent magnet is substantially perpendicular to the axis of each of said first plurality of coils.

8. An apparatus for controlling the activation of a motor vehicle safty restraint system responsive to a crash as recited in claim 1, wherein an axis of said first plurality of coils are located proximate a common plane.

9. An apparatus for controlling the activation of a motor vehicle safety restraint system responsive to a crash as recited in claim 1, wherein at least two of said first plurality of coils are located so as to be subjected to substantially the same crash induced motion.

10. An apparatus for controlling the activation of a motor vehicle safety restraint system responsive to a crash as recited in claim 1, wherein said processor discriminates said relative motion in more than one direction.

11. An apparatus for controlling the activation of a motor vehicle safety restraint system responsive to a crash as recited in claim 1, wherein one of said two proximal elements is proximate a relatively rigid structural element for transferring a crash signal from the point of crash impact to said one of said two proximal elements.

12. An apparatus for controlling the activation of a motor vehicle safety restraint system responsive to a crash as recited in claim 11, wherein said relatively rigid structural element is a reinforcing beam of a door.

13. An apparatus for controlling the activation of a motor vehicle safety restraint system responsive to a crash as recited in claim 2, further comprising:
   a. a second magnetic circuit spanning between proximal portions of a second set of two proximal elements of a motor vehicle which undergo relative motion responsive to the crash, wherein said second magnetic circuit comprises:
      i). a second plurality of coils responsive to the magnetic field of said second magnetic circuit;
      ii). at least one second permanent magnet as the source of magnetomotive force for said second magnetic circuit; and
      iii). at least one second air gap between said second set of two proximal elements of the motor vehicle, wherein said at least one second air gap defines a second separation zone, said processor is operatively connected to said second plurality of coils, said magnetic field of said second magnetic circuit is responsive to said relative motion of said second set of two proximal elements of said motor vehicle, each of said second plurality of coils generates a signal responsive to the changes in said magnetic field of said second magnetic circuit, one of said second set of two proximal elements of said motor vehicle comprises an edge wall of a second door of said motor vehicle and the other of said second set of two proximal elements of said motor vehicle comprises a fixed portion of said motor vehicle adjacent thereto, and both said other of said first set of two proximal elements and said other of said second set of two proximal elements comprise the B-pillar of said motor vehicle.

14. An apparatus for controlling the activation of a motor vehicle safety restraint system responsive to a crash as recited in claim 1, wherein said first plurality of coils consists of two coils.

15. An apparatus for controlling the activation of a motor vehicle safety restraint system responsive to a crash as recited in claim 1, wherein said first plurality of coils are located on two opposing planes disposed about an axis of said at least one first permanent magnet.

16. An apparatus for controlling the activation of a motor vehicle safety restraint system responsive to a crash as recited in claim 15, wherein two of said first plurality of coils are located in each of said two opposing planes.

17. An apparatus for controlling the activation of a motor vehicle safety restraint system responsive to a crash as recited in claim 1, further comprising an accelerometer operatively connected to one of said two proximal elements, whereby said processor is operatively connected to said accelerometer and said processor is further responsive to the signal from said accelerometer.

18. An apparatus for controlling the activation of a motor vehicle safety restraint system responsive to a crash, comprising:
  a. a motor vehicle comprising a first set of two proximal elements that undergo relative motion responsive to the crash, wherein one of said two proximal elements of said motor vehicle comprises an edge wall of a first door of the vehicle and the other of said two proximal elements of the motor vehicle comprises a fixed portion of the vehicle proximate thereto;
  b. a first magnetic circuit spanning between proximal portions of said first set of two proximal elements of said motor vehicle, wherein said first magnetic circuit comprises:
    i) at least one first air gap between said two proximal elements of the motor vehicle, wherein said at least one first air gap defines a first separation zone;
    ii) a first plurality of coils responsive to the magnetic field of said first magnetic circuit, wherein an axis of each of said first plurality of coils is substantially normal to said first separation zone and said first plurality of coils are attached to said fixed portion of the vehicle and said at least one first permanent magnet is attached to said edge wall of said first door of the vehicle; and
    iii) at least one first permanent magnet as the source of magnetomotive force for said first magnetic circuit; and
  c. a processor operatively connected to said first plurality of coils, wherein said magnetic field of said first magnetic circuit is responsive to said relative motion of said two proximal elements of the motor vehicle, each of said first plurality of coils generates a signal responsive to the changes in said magnetic field of said first magnetic circuit, and said processor controls the activation of the motor vehicle safety restraint system responsive to said signal.

19. An apparatus for controlling the activation of a motor vehicle safety restraint system responsive to a crash as recited in claim 18, wherein said first plurality of coils comprise a plurality of coils located substantially on a plane.

20. An apparatus for controlling the activation of a motor vehicle safety restraint system responsive to a crash, comprising:
  a. a motor vehicle comprising a first set of two proximal elements that undergo relative motion responsive to the crash, wherein one of said two proximal elements of said motor vehicle comprises an edge wall of a first door of the vehicle and the other of said two proximal elements of the motor vehicle comprises a fixed portion of the vehicle proximate thereto;
  b. a first magnetic circuit spanning between proximal portions of said first set of two proximal elements of said motor vehicle, wherein said first magnetic circuit comprises:
    i) at least one first air gap between said two proximal elements of the motor vehicle, wherein said at least one first air gap defines a first separation zone;
    ii) a first plurality of coils responsive to the magnetic field of said first magnetic circuit, wherein an axis of each of said first plurality of coils is substantially normal to said first separation zone and said first plurality of coils are attached to said edge wall of said first door of the vehicle and said at least one first permanent magnet is attached to said fixed portion of the vehicle; and
    iii) at least one first permanent magnet as the source of magnetomotive force for said first magnetic circuit; and
  c. a processor operatively connected to said first plurality of coils, wherein said magnetic field of said first magnetic circuit is responsive to said relative motion of said two proximal elements of the motor vehicle, each of said first plurality of coils generates a signal responsive to the changes in said magnetic field of said first magnetic circuit, and said processor controls the activation of the motor vehicle safety restraint system responsive to said signal.

21. A method of controlling the activation of a motor vehicle safety restraint system responsive to a crash, comprising:
  a. creating a magnetic field between proximal portions of two proximal elements of a motor vehicle which undergo relative motion responsive to the crash, wherein the strength of said magnetic field is responsive to said relative motion;
  b. creating a plurality of signals responsive to said magnetic field, wherein each of said plurality of signals is responsive at a distinct location; and
  c. controlling the activation of the motor vehicle safety restraint system responsive to said plurality of signals.

22. A method of controlling the activation of a motor vehicle safety restraint system responsive to a crash as recited in claim 21, further comprising the steps of measuring the magnitudes of said plurality of signals and determining which of said plurality of signals has the maximum amplitude, wherein the operation of controlling the activation of the motor vehicle safety restraint system is dependent upon the magnitude of the maximum amplitude signal.

23. A method of controlling the activation of a motor vehicle safety restraint system responsive to a crash as recited in claim 21, further comprising the steps of measuring the magnitudes of said plurality of signals, determining which of said plurality of signals has the maximum amplitude, and measuring the width of the maximum amplitude signal, wherein the operation of controlling the activation of the motor vehicle safety restraint system is dependent upon said width of the maximum amplitude signal.

24. A method of controlling the activation of a motor vehicle safety restraint system responsive to a crash as recited in claim 21, wherein the operation of controlling the activation of the motor vehicle safety restraint system is dependent upon the separation in time of said plurality of signals.

25. A method of controlling the activation of a motor vehicle safety restraint system responsive to a crash as recited in claim 21, wherein said magnetic field is created by at least one permanent magnet and said plurality of signals are created by a plurality of coils, further comprising the step of setting the initial position of said permanent magnet relative to said plurality of coils.

26. A method of controlling the activation of a motor vehicle safety restraint system responsive to a crash, comprising:
   a. creating a magnetic field between proximal portions of two proximal elements of a motor vehicle which undergo relative motion responsive to the crash, wherein the strength of said magnetic field is responsive to said relative motion;
   b. creating a plurality of signals responsive to said magnetic field, wherein each of said plurality of signals is responsive at a distinct location; and
   c. controlling the activation of the motor vehicle safety restraint system responsive to said plurality of signals; and
   d. estimating the direction of said relative motion from the magnitude and phase of said plurality of signals.

27. An apparatus for controlling the activation of a motor vehicle safety restraint system responsive to a crash comprising:
   a. a magnetic circuit spanning between proximal portions of two proximal elements of a motor vehicle which undergo relative motion responsive to the crash, wherein said magnetic circuit has a magnetic field and a reluctance, the magnetic field of said magnetic circuit is responsive to the reluctance of said magnetic circuit, the reluctance of said first magnetic circuit responsive to said relative motion, and said magnetic circuit comprises:
      i). at least one coil responsive to the magnetic field of said magnetic circuit wherein said at least one coil is operatively connected to the first of said two proximal elements;
      ii). at least one permanent magnet as the source of magnetomotive force for said magnetic circuit wherein said at least one permanent magnet is operatively connected to the first of said two proximal elements; and
      iii). a ferromagnetic structure operatively connected to the second of said two proximal elements; and
   b. a processor operatively connected to said plurality of coils, wherein said magnetic field of said magnetic circuit is responsive to said relative motion of said two proximal elements of said motor vehicle, each of said at least one coils generates a signal responsive to the changes in said magnetic field of said magmetic circuit, and said processor controls the activation of the motor vehicle safety restraint system responsive to said signal.

28. An apparatus for controlling the activation of a motor vehicle safety restraint system responsive to a crash as recited in claim 27, wherein said ferromagnetic structure is formed with a magnetic coating.

29. An apparatus for controlling the activation of a motor vehicle safety restraint system responsive to a crash, comprising:
   a. a magnetic circuit spanning between proximal portions of two proximal elements of a motor vehicle which undergo relative motion responsive to the crash, wherein said magnetic circuit comprises:
      i). at least one coil responsive to the magnetic field of said magnetic circuit wherein said at least one coil is operatively connected to the first of said two proximal elements;
      ii). at least one permanent magnet as the source of magnetomotive force for said magnetic circuit wherein said at least one permanent magnet is operatively connected to the first of said two proximal elements; and
      iii). a ferromagnetic structure operatively connected to the second of said two proximal elements, wherein said ferromagnetic structure comprises a patterned surface and the spatial properties of said patterned surface provide inherent band pass filtering of said signal; and
   b. a processor operatively connected to said plurality of coils, wherein said magnetic field of said magnetic circuit is responsive to said relative motion of said two proximal elements of the motor vehicle, each of said at least one coils generates a signal responsive to the changes in said magnetic field of said magmetic circuit, and said processor controls the activation of the motor vehicle safety restraint system responsive to said signal.

30. An apparatus for controlling the activation of a motor vehicle safety restraint system responsive to a crash, comprising:
   a. a magnetic circuit spanning between proximal portions of two proximal elements of a motor vehicle which undergo relative motion responsive to the crash, wherein said magnetic circuit comprises:
      i). at least one coil responsive to the magnetic field of said magnetic circuit wherein said at least one coil is operatively connected to the first of said two proximal elements;
      ii). at least one permanent magnet as the source of magnetomotive force for said magnetic circuit wherein said at least one permanent magnet is operatively connected to the first of said two proximal elements; and
      iii). a ferromagnetic structure operatively connected to the second of said two proximal elements, wherein said ferromagnetic structure comprises a patterned surface; and
   b. a processor operatively connected to said plurality of coils, wherein said magnetic field of said magnetic circuit is responsive to said relative motion of said two proximal elements of said motor vehicle, each of said at least one coils generates a signal responsive to the changes in said magnetic field of said magnetic circuit, and said processor controls the activation of the motor vehicle safety restraint system responsive to said signal.

31. An apparatus for controlling the activation of a motor vehicle safety restraint system responsive to a crash comprising:
   a. a magnetic circuit spanning between proximal portions of two proximal elements of a motor vehicle which undergo relative motion responsive to the crash, wherein said magnetic circuit comprises:
      i). at least one coil responsive to the magnetic field of said magnetic circuit, wherein said at least one coil is operatively connected to the first of said two proximal elements;
      ii). a permanent magnet as the source of magnetomotive force for said magnetic circuit wherein said permanent magnet is operatively connected to the second of said two proximal elements;
      iii). a biasing mechanism for biasing said permanent magnet and said at least one coil against one another when said two proximal elements are proximate to one another; and
   b. a processor operatively connected to said at least one coil coils, wherein said magnetic field of said magnetic circuit is responsive to said relative motion of said two proximal elements of said motor vehicle, each said at least one coil generates a signal responsive to the changes in said magnetic field of said magnetic circuit, and said processor controls the activation of the motor vehicle safety restraint system responsive to said signal.

32. An apparatus for controlling the activation of a motor vehicle safety restraint system responsive to a crash, comprising:
   a. a motor vehicle comprising a first set of two proximal elements that undergo relative motion responsive to the crash,wherein one of said two proximal elements is at the distal end of a hinged member;
   b. a first magnetic circuit spanning between proximal portions of said two proximal elements of said motor vehicle, wherein said first magnetic circuit comprises:
      i). a first plurality of coils responsive to the magnetic field of said first magnetic circuit;
      ii). at least one first permanent magnet as the source of magnetomotive force for said first magnetic circuit; and
      iii). at least one first air gap between said two proximal elements of said motor vehicle, wherein said at least one first air gap defines a first separation zone; and
   c. a processor operatively connected to said first plurality of coils, wherein said magnetic field of said first magnetic circuit is responsive to said relative motion of said two proximal elements of said motor vehicle, each of said first plurality of coils generates a signal responsive to the changes in said magnetic field of said first magnetic circuit, and said processor controls the activation of said motor vehicle safety restraint system responsive to said signal.

33. A method of controlling the activation of a motor vehicle safety restraint system responsive to a crash, comprising:
   a. creating a magnetic field between proximal portions of an edge wall of a door of a motor vehicle and a fixed portion of said motor vehicle, wherein said the strength of said magnetic field is responsive to relative motion of said proximal portions;
   b. creating at least one signal responsive to said magnetic field, wherein said at least one signal is responsive at a distinct location;
   c. controlling the activation of the motor vehicle safety restraint system responsive to said at least one signal; and
   d. calibrating said at least one signal responsive to the normal operation of said door.

34. An apparatus for controlling the activation of a motor vehicle safety restraint system responsive to a crash, comprising:
   a. a magnetic circuit spanning between an edge wall of a door of a motor vehicle and a fixed portion of said motor vehicle adjacent thereto, wherein said magnetic circuit comprises:
      i). at least one coil responsive to the magnetic field of said magnetic circuit; and
      ii). at least one permanent magnet as the source of magnetomotive force for said magnetic circuit; and
   b. a processor operatively connected to said at least one coil, wherein said magnetic field of said magnetic circuit is responsive to the motion of said edge wall of said door relative to said fixed portion of said motor vehicle, each said at least one coil generates a signal responsive to the changes in said magnetic field of said first magnetic circuit, and said processor controls the activation of the motor vehicle safety restraint system responsive to said signal.

* * * * *